US012719923B1

(12) United States Patent
Gupta et al.

(10) Patent No.: US 12,719,923 B1
(45) Date of Patent: Aug. 25, 2026

(54) DNS CONFIGURATION IN SERVERLESS APPLICATIONS

(71) Applicant: Amazon Technologies, Inc., Seattle, WA (US)

(72) Inventors: Kshitij Gupta, Seattle, WA (US); Prashant Kumar Singh, Seattle, WA (US); Ravi S. Nagayach, Aurora, IL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/753,969

(22) Filed: Jun. 25, 2024

(51) Int. Cl.
*H04L 9/40* (2022.01)
*H04L 61/4511* (2022.01)

(52) U.S. Cl.
CPC ........ *H04L 63/145* (2013.01); *H04L 61/4511* (2022.05); *H04L 63/0236* (2013.01); *H04L 63/1425* (2013.01)

(58) Field of Classification Search
CPC ............... H04L 63/145; H04L 61/4511; H04L 63/0236; H04L 63/1425; H04L 61/45; G06F 9/455; G06F 9/50
See application file for complete search history.

(56) References Cited

U.S. PATENT DOCUMENTS 9,323,556 B2 * 4/2016 Wagner ................... G06F 9/547
9,760,387 B2 * 9/2017 Wagner ............... G06F 9/45558
10,599,453 B1 * 3/2020 Rathnavelu ......... G06F 9/45558
10,616,179 B1 * 4/2020 McCarriar .......... H04L 61/2514
10,862,852 B1 * 12/2020 Thunga ................. H04L 67/565
11,252,126 B1 * 2/2022 Thunga ................... H04L 45/48
11,362,986 B2 * 6/2022 Thunga ............... H04L 63/0272
11,489,814 B1 * 11/2022 Engskow ............ H04L 63/0236
11,892,997 B1 * 2/2024 Uthaman ............ H04L 61/4511
11,991,291 B1 * 5/2024 Solapurkar ......... H04L 61/4511
12,107,820 B2 * 10/2024 Zhou .................. G06F 9/45558

(Continued)

OTHER PUBLICATIONS

Desnoyers, "Using the Linux Kernel Tracepoints," kernel.org, https://web.archive.org/web/20240604193558/https://www.kernel.org/doc/html/latest/trace/tracepoints.html, as archived Jun. 4, 2024 in 4 pages.

(Continued)

*Primary Examiner* — Jimmy H Tran
(74) *Attorney, Agent, or Firm* — Knobbe, Martens, Olson & Bear, LLP

(57) ABSTRACT

Systems and methods are described for facilitating custom DNS configurations relating to one or more serverless functions executing in one or more function execution environments. A DNS system may be implemented in a serverless execution environment with at least one host system hosting the one or more one or more function execution environments. The DNS system may facilitate implementation of custom DNS configurations received from an end user with respect to the one or more serverless functions. The DNS system may store DNS records in a DNS cache in compliance with DNS configurations. The DNS system also be isolated from the function execution environments in a separate execution environment such that the DNS cache of the DNS system may serve as a source of truth from which to assess that a serverless function of a virtual machine instance has been compromised by a malicious actor, such as through malware.

21 Claims, 6 Drawing Sheets

(56) References Cited

U.S. PATENT DOCUMENTS

| | | | | |
|---|---|---|---|---|
| 12,323,468 | B2 * | 6/2025 | Baker | H04L 63/20 |
| 2008/0183853 | A1 * | 7/2008 | Manion | H04L 67/1093 709/223 |
| 2016/0092251 | A1 * | 3/2016 | Wagner | G06F 9/5077 718/1 |
| 2016/0092252 | A1 * | 3/2016 | Wagner | G06F 9/45533 718/1 |
| 2016/0164762 | A1 * | 6/2016 | Reque | H04L 47/808 718/1 |
| 2018/0062917 | A1 * | 3/2018 | Chandrashekhar | G06F 11/2035 |
| 2018/0316612 | A1 * | 11/2018 | Akers | H04L 45/745 |
| 2018/0351904 | A1 * | 12/2018 | Mizik | G06F 9/445 |
| 2018/0367528 | A1 * | 12/2018 | Schwarz | H04L 63/0807 |
| 2019/0073234 | A1 * | 3/2019 | Wagner | G06F 9/5005 |
| 2019/0108058 | A1 * | 4/2019 | Wagner | G06F 9/50 |
| 2019/0196884 | A1 * | 6/2019 | Wagner | G06F 9/45533 |
| 2019/0319914 | A1 * | 10/2019 | Petersen | H04L 61/103 |
| 2020/0004571 | A1 * | 1/2020 | Piwonka | G06F 8/30 |
| 2021/0021634 | A1 * | 1/2021 | Babakian | H04L 61/2567 |
| 2021/0026692 | A1 * | 1/2021 | Mestery | G06F 9/505 |
| 2021/0073065 | A1 * | 3/2021 | Bhatnagar | G06F 11/079 |
| 2021/0119961 | A1 * | 4/2021 | Thunga | H04L 61/4511 |
| 2021/0314240 | A1 * | 10/2021 | Liu | H04L 12/66 |
| 2021/0344651 | A1 * | 11/2021 | Joshi | H04L 12/4641 |
| 2021/0367944 | A1 * | 11/2021 | Gupta | H04L 67/125 |
| 2021/0374235 | A1 * | 12/2021 | Brossard | G06F 21/604 |
| 2022/0182857 | A1 * | 6/2022 | Mutalikdesai | H04W 24/08 |
| 2022/0263793 | A1 * | 8/2022 | Baker | H04L 61/2557 |
| 2023/0031462 | A1 * | 2/2023 | Keane | H04L 45/74 |
| 2023/0412496 | A1 * | 12/2023 | Kreger-Stickles | H04L 63/0236 |
| 2024/0179117 | A1 * | 5/2024 | Zhou | H04L 61/58 |
| 2024/0214350 | A1 * | 6/2024 | Sole | H04L 63/0807 |
| 2024/0265057 | A1 * | 8/2024 | Kol | G06F 16/958 |
| 2025/0159003 | A1 * | 5/2025 | Potekhin | H04L 63/1416 |
| 2025/0168199 | A1 * | 5/2025 | Gupta | H04L 61/4511 |
| 2025/0173450 | A1 * | 5/2025 | Mystetskyi | G06F 21/6218 |
| 2025/0280043 | A1 * | 9/2025 | Baker | H04L 63/20 |
| 2025/0286857 | A1 * | 9/2025 | Miglani | H04L 61/4511 |
| 2025/0300969 | A1 * | 9/2025 | Bailey | H04L 63/126 |
| 2025/0310185 | A1 * | 10/2025 | Singh | G06F 9/5072 |
| 2025/0392564 | A1 * | 12/2025 | Pittner | H04L 61/4511 |
| 2026/0030310 | A1 * | 1/2026 | Shribman | G06F 16/955 |

OTHER PUBLICATIONS

"DNS A record," cloudfare.com, https://web.archive.org/web/20240604192755/https://www.cloudflare.com/learning/dns/dns-records/dns-a-record/, as archived Jun. 4, 2024 in 3 pages.

"DNS NS record," cloudfare.com, https://web.archive.org/web/20240604192619/https://www.cloudflare.com/learning/dns/dns-records/dns-ns-record, as archived Jun. 4, 2024 in 3 pages.

"eBPF Documentation," ebpf.io, https://web.archive.org/web/20240604212113/https://ebpf.io/what-is-ebpr, as archived Jun. 4, 2024 in 20 pages.

"FUSE," kernel.org, https://web.archive.org/web/20240604194617/https://www.kernel.org/doc/html/latest/filesystems/fuse.html, as archived Jun. 4, 2024 in 8 pages.

"Instances and AMIs," docs.aws.amazon.com, https://web.archive.org/web/20240604211109/https://docs.aws.amazon.com/AWSEC1/latest/UserGuide/ec2-instances-andamis.html, as archived Jun. 4, 2024 in 3 pages.

"Red Hat Fuse," developers.redhat.com, https://web.archive.org/web/20240604193742/https://developers.redhat.com/products/fuse/overview, as archived Jun. 4, 2024 in 4 pages.

"The components of the Nitro System," docs.aws.amazon.com, https://web.archive.org/web/20240604211707/https://docs.aws.amazon.com/whitepapers/latest/security-design-of-aws-nitro-system/the-components-of-the-nitro-system.html, as archived Jun. 4, 2024 in 6 pages.

"What is caching?" cloudfare.com, https:www.cloudflare.com/learning/cdn/what-is-caching/. as retrieved Jun. 4, 2024 in 5 pages.

"What is DNS cache poisoning? | DNS spoofing," cloudfare.com, https://web.archive.org/web/20240604191938/https://www.cloudflare.com/learning/dns/dns-cache-poisining/, as archived Jun. 4, 2024 in 8 pages.

"What is DNS? | How DNS Works," cloudfare.com, https://web.archive.org/web/20240604192337/https://www.cloudflare.com/learning/dns/what-is-dns/, as archived Jun. 4, 2024 in 12 pages.

* cited by examiner

DNS CONFIGURATION IN SERVERLESS APPLICATIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

DETAILED DESCRIPTION

Figure 1:
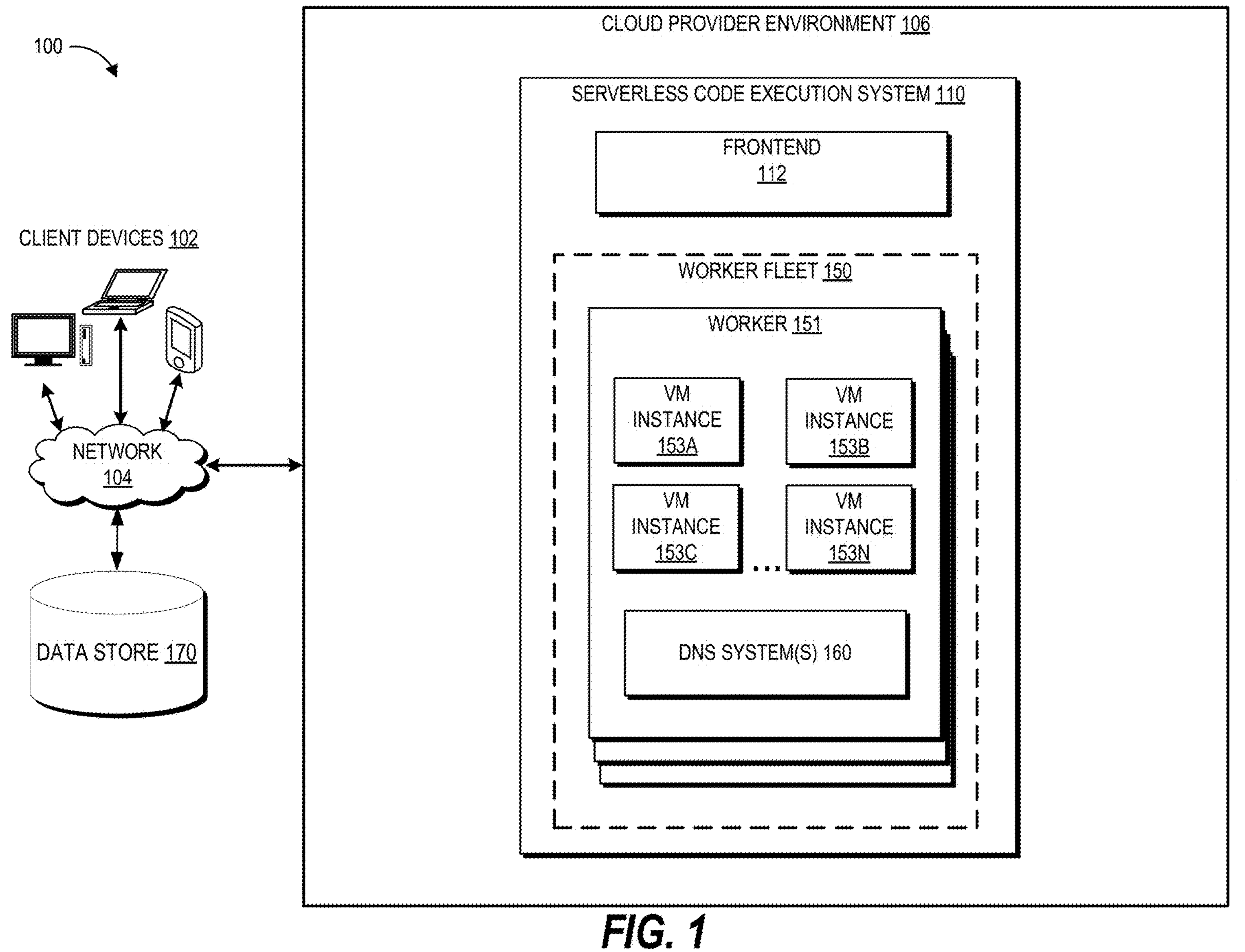
FIG. 1 is a block diagram depicting an illustrative environment in which a cloud provider environment enables secure DNS configurations with respect to executions of serverless functions implemented on a virtualized networking service.

In modern computing environments, serverless applications are becoming increasingly popular due to their scalability, cost-effectiveness, and ease of deployment. However, existing serverless solutions often lack flexibility and control over Domain Name System (DNS) configurations for these applications. Users are typically limited to using the default DNS settings provided by the serverless platform, which may not meet their specific requirements for security, performance, or operational needs. Additionally, customers have no visibility into DNS query logs, which can be crucial for troubleshooting, security analysis, and operational improvements. Furthermore, existing solutions do not allow customers to configure advanced DNS settings, such as custom nameservers, query filtering, caching configurations, EDNS0 options, retry options, and search domains, which can be essential for various use cases.

The above challenges, among others, are addressed by embodiments of the present disclosure, which address these limitations by leveraging an eBPF-based DNS caching system running on the host in a trusted space, providing security and isolation benefits while enabling users to configure DNS settings for serverless applications. A new API, referred to in some implementations as "CreateOrUpdateServerlessDNS," is introduced, allowing users to configure various DNS settings for their serverless application instances (which may, in some implementations, be micro-virtual machines (micro-VMs)). These settings can include custom nameservers (independent of VPC DHCP options), query logging and filtering, caching configurations (stale caching, TTL), EDNS0 options, retry options, and search domains. S Fuse-based copy-on-write file system can be used to update the resolv.conf file in the micro-VM with the configured nameservers and search domains. The DNS configuration settings provided through the API can be updated in eBPF maps, which are then used by the eBPF-based DNS caching system to apply the desired configurations.

This empowers serverless users with greater control and flexibility over DNS configurations for their serverless applications, enabling features like custom nameservers, query logging and filtering, and caching configurations, all while maintaining security and isolation by running the DNS caching system in the trusted host space.

Generally described, aspects of the present disclosure relate to supporting domain name system (DNS) configurations with respect to serverless instances, such as instances of serverless code functions. Such functionality can extend benefits of existing serverless offerings at least by enabling users to create and update DNS configurations with respect to instances of serverless code functions in a virtualized network environment, such as compute and storage resources in a "virtual private cloud" or other isolated environments. Specifically, aspects of the present disclosure enable an end user, such as the owner of a serverless function (or other serverless functionality), to create and update DNS configurations (e.g., properties, settings, etc.) for the serverless function (or other serverless functionality).

In typical serverless technologies, a cloud provider service handles the underlying server infrastructure. Illustratively, as used herein, a serverless code execution system (which may also be referred to as an "on-demand code execution system") enables rapid execution of source code, which may be supplied by users of the on-demand code execution system. For example, a user may submit code in a specific programming language (e.g., the PYTHON™ language) that, when executed, implements network-based processing for a user-facing application (e.g., a mobile device "app"). The serverless code execution system can then enable the user to submit "calls" or "invocations" to execute that code, at which point the system will securely execute the code to provide the desired functionality. Embodiments for providing a serverless code execution system are provided, for example, in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. In brief, an on-demand code execution system can enable client devices to submit executable code (e.g., source code) implementing desired functionality, which functionality is generally referred to herein as a "task" or a "function." The system can further enable a client device to define one or more triggers that result in execution of the code on the system. For example, a client device may request that each time a specific application programming interface (API) call is made, the code should be executed on the serverless code execution system. When a trigger occurs, the serverless code execution system can configure an execution environment for the code, which may correspond to a virtual machine instance, a software container, or other logically isolated environment in which code can execute. The serverless code execution system can then execute the code within the environment, resulting in a task execution. When the task execution completes, the serverless code execution system can remove the environment, thus freeing computing resources for other task executions.

Unlike some other network-based services, a serverless system (of which a serverless code execution system is one example among many, including serverless data storage, data transformation, data stream handling, data searching, and databases) can remove the need for a user to maintain or configure a computing device, either virtual or physical, to support serverless functionality. Due to this lack of need for a user to maintain a device, serverless systems are referred to as "serverless" (though of course the serverless system itself, as opposed to individual users, may maintain servers to support serverless functionality).

A serverless system implementing a serverless service (e.g., a network-based service that implements functionality of the server in a serverless manner) may be provided as part of a variety of network-based services. For example, a serverless system may be provided as part of a hosted computing environment providing a number of rapidly provisioned and released computing resources. A hosted computing environment may also be referred to as a "cloud computing environment." Illustratively, a cloud computing environment may include a distributed set of physical computing resources that can be rapidly acquired for use by users of the cloud computing environment. Often, the cloud computing environment can provide resources to users in the form of virtualized compute resources, such as virtual machines, virtual storage volumes, various other functionalities implemented using virtual machines or storage volumes, etc. In addition, a cloud computing environment may provide for virtualized networking functionality. For example, the cloud computing environment can include a variety of distributed systems in communication via a physical substrate network. The cloud computing environment may define multiple virtualized logical networks on top of the physical substrate network, via which resources on the environment can communicate. For example, the cloud computing environment may enable clients to acquire access to virtual computing resources (e.g., virtual machines) that are provided with network addresses in a logical network. In some cases, these network addresses may be isolated from other resources. For example, a set of network resources may share a specific subnet (e.g., a /24 IP version 4 subnet in Classless Inter-Domain Routing or CIDR notation) and have no access to network resources outside that subnet, or access limited by various network functionalities (e.g., a firewall). Thus, using a cloud computing environment, a user may acquire a variety of compute resources (such as virtual compute resources) and arrange such resources into an isolated network. As a result, users may acquire computing resources similar to those provided by traditional data centers, without requiring that the end user physically manage computing devices, networks, or the like.

In addition to serverless code execution system, other types of serverless services may also exist. This may include other types of serverless computes, such as serverless machine learning models, serverless Audio/Video processing, serverless extract, transform, and load (ETL), etc. Other types of serverless services may also include types of serverless data storage, such as serverless databases, data lakes, data stream handling, data transformation, serverless search systems, etc.

At a high level, serverless systems may provide serverless functionality by obtaining requests that require computing resources and programmatically identifying, allocating, and managing those resources to respond to the requests. For example, a serverless code execution system may operate by accepting requests to execute code, identifying, allocating, and managing an execution environment to execute the code (including, e.g., provisioning environment with the code, any dependencies, etc.), and then instructing the environment to execute the code in response to the requests. An environment for serverless functionality may be referred to as an "instance" of the functionality (a "serverless instance"). Each serverless instance is illustratively implemented using an underlying host computing device, potentially using one or more virtualization layers (e.g., a virtual machine, a software container, or the like). To provide networking functionality, the host computing device generally can include a physical network interface controller (NIC). Depending on the configuration, a serverless instance may access a network directly via the physical NIC or via a virtual NIC layered on top of the physical NIC. As part of the process of managing the serverless instance, the serverless system can configure the (physical or virtual) NIC with an IP address, firewalls, etc.

Because the server infrastructure is abstracted away, an end user of the typical serverless technology, such as the serverless code execution system described above, may accordingly increase focus on development of their software applications. However, abstraction of the server infrastructure comes at a cost. DNS configurations, for example, are typically set up on a per server basis. Accordingly, setting up DNS configurations in typical serverless systems is typically limited at best. The end user, however, may still want to add DNS configurations to facilitate operation of their serverless functions, such as by configuring how their serverless function communicates with other network-accessible applications (e.g., external applications, databases, etc.).

In some typical solutions, an end user may be able to connect a serverless function to a virtual private cloud (VPC) and manage some DNS configurations, such as nameservers and domain names via dynamic host configuration protocol (DHCP) options. However, they may not be able provide custom configurations including, but not limited to, custom nameservers (e.g., for accessing external applications, databases, etc.), logging options to log specified packets (e.g., according to packet direction, internet protocol (IP) address, etc.), add tags to data (e.g., customer identifiers, data type identifiers, instance identifiers, etc.) extension mechanisms for DNS (EDNS) options, stale caching options, time to live (TTL options), retry options, search options, the like, or some combination thereof. A user may, for example, require a larger query size and/or response size that is not supported by DHCP options. As another example, a user may manage VM instances for other users and may therefore wish to add tags or other identifiers to DNS queries and responses to identify the other users, which may not be supported by DHCP options. Accordingly, inability to provide custom DNS configurations may limit an end user's ability to optimize performance of their systems, such as by enhancing security (e.g., by configuring DNS query-logging or filtering options), improving DNS resolution speed, facilitating troubleshooting, the like, or some combination thereof.

Aspects of the present disclosure address these problems, among others by providing support for a DNS system or systems corresponding to serverless instances hosting serverless functions. The DNS system or systems allow an end user to configure DNS, if desired, without requiring configuration of a particular server. Instead, DNS configurations are linked to a serverless function, through use of a DNS system or systems. The resources (e.g., servers, databases, etc.) of the serverless architecture used to implement the serverless function thereby implement the DNS configurations. Each DNS system may, for example, correspond to an individual serverless instance. This advantageously allows end users to modify DNS configurations (e.g., properties, settings, etc.) at any time of the serverless instance's lifecycle (e.g., initialization, invocation, and shutdown). Illustratively, end users may use an individual DNS system to provide DNS configurations for the respective serverless instance to advantageously facilitate operation of serverless functions executing on the serverless instance. For example, an end user may set TTL options to balance resolution speed with resolution accuracy, such as ensuring that changes to DNS records (e.g., updating an IP address, changing DNS records, etc.), are captured. As another example, an end user may set DNS query logging and filtering options to facilitate identification of unusual or suspicious DNS query behavior, such as by excluding domains associated with bad actors or by facilitating analysis of logged files.

The DNS system(s) may also address security with respect to DNS configurations. A problem in typical cloud computing systems, for example, is vulnerabilities for the code of an end user's function with respect to malware. Code for an end user's function may illustratively include external dependencies, such as dependencies to open-source libraries. The open-source libraries may not be under the control of the owner of the function (e.g., end user). Accordingly, there is a risk that the open-source libraries could include malware. This malware could infect the code of the function. Typical DNS configurations in cloud computing environments may be included in the same environment as the code for their corresponding functions. This may increase the risk of attack. Another potential risk is DNS cache poisoning where bad actors add false data to the DNS cache, which may direct end users to the wrong websites. The risk of DNS cache poisoning can be mitigated by allowing end users to adjust DNS configurations, such as to correct the false information or reduce the amount of time false information remains in the DNS cache.

One advantage of serverless technologies is that code execution for each serverless function is often isolated by virtualization boundaries, which separate the underlying server infrastructure from the code of the serverless function. The virtualization boundaries thereby also serve to isolate serverless functions executing in separate serverless instances from each other. This abstraction of serverless infrastructure makes it easier to isolate and contain issues caused by malware.

The DNS system(s) of the present disclosure may take advantage of the isolation offered by such virtualization boundaries. The DNS system(s) may, for example, operate in a host system (referred to herein as a worker) as isolated from the serverless instance(s) through one or more virtualization boundaries. Illustratively, the serverless instances may operate as logically partitioned execution environments within a partitioned user space on the worker. The DNS system(s) may thereby operate in a separate execution environment from the serverless instance(s). This isolation may advantageously protect information included in the DNS system(s), such as DNS query results, from the operations of the serverless instances. By way of illustration, if a serverless instance becomes compromised, which may be evidenced by sending out spurious DNS queries, the DNS system may remain uncompromised and therefore serve as a source of truth for detecting and analyzing whether an attack has occurred (e.g., an attack to compromise the serverless instances).

As another example, the DNS system(s) may be isolated in separate execution environments from their corresponding serverless instance through implementation on one or more "offload cards." Each offload card is an isolated processor and memory within a bare metal computing instance that is capable of configuring a serverless instance and, in some cases, controlling inputs to and outputs from the serverless instance. Accordingly, implementation of a DNS system on an offload card may thereby create a physical boundary between the DNS system and its corresponding serverless instance, at least because the DNS system will run on a processor of the offload card and the serverless instance will run on a processor of a separate server (e.g., of at least one cloud provider server). The physical boundary between the processors may advantageously increase the likelihood that the DNS system will remain uncompromised in the event that one or more serverless instances have been compromised. DNS cache(s) of DNS system(s) implemented on offload card(s) may therefore serve as a source of truth for detecting and analyzing whether an attack has occurred.

The above-described aspects and other aspects of the disclosure will now be described with regard to certain examples, embodiments, and aspects, which are intended to illustrate, but not limit, the disclosure. The foregoing aspects and many of the attendant advantages of this disclosure will become more readily appreciated as the same become better understood by reference to the following description, when taken in conjunction with the accompanying drawings.

FIG. 1 is a block diagram of an illustrative execution environment 100 in which embodiments of the present disclosure may be implemented. Specifically, in FIG. 1, client devices 102 may utilize a network 104 to interact with a cloud provider environment 106, including a serverless code execution system 110 facilitating execution of serverless functions, DNS system(s) 160 to support DNS configuration and queries relating to execution of serverless functions (e.g., hosted on VM instances 153), and a virtualized networking service 109 enabling creation of virtualized isolated networks (including VM instances 153). In accordance with embodiments of the present disclosure, the cloud provider environment 106 may facilitate management of DNS queries for serverless functions implemented on a virtualized networking service.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The cloud provider environment 106 may provide the client devices 102 with one or more user interfaces, command-line interfaces (CLIs), application programing interfaces (APIs), and/or other programmatic interfaces for utilizing services provided by the cloud provider environment 106. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the cloud provider environment 106.

The client devices 102 and cloud provider environment 106 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Illustratively, various components of the cloud provider environment 106 are in communication with one another via a substrate network. The substrate network may be dedicated to management and operation of the cloud provider environment 106, and thus inaccessible to, for example, the network 104. Rather, the substrate network can support virtualized logical networks that operate "on top" of the substrate network to facilitate secure communication between particular elements of the cloud provider environment 106, such as VM instances 153 and DNS system(s) 160. These virtualized logical networks are illustratively dynamic and reconfigurable, such that communication between certain elements or components of the cloud provider environment 106 can be controlled by reconfiguration of virtualized logical networks, as opposed to physical modification of the substrate network.

The cloud provider environment 106 includes a serverless code execution system 110. In FIG. 1, users, by way of client computing devices 102, may interact with the serverless code execution system 110 to provide source code, and establish rules or logic defining when and how such code should be executed on the serverless code execution system 110, thus establishing a "task" or "function." The users may (e.g., by way of client computing devices 102), in some examples, also provide a DNS configuration specifying parameters including, but not limited to, custom nameservers (e.g., for accessing external applications, databases, etc.), logging options to log specified packets (e.g., according to packet direction, IP address, customer identifier, user-specified identifier, etc.), logging options to add tags or other identifiers to specified packets (e.g., customer identifier, instance identifier, other identifiers, etc.), EDNS options, stale caching options, time to life (TTL) options, retry options, search options, the like, or some combination thereof. Illustratively, users may provide DNS configuration settings through an API, referred to in some implementations as "CreateOrUpdateServerlessDNS" The settings may them provide the DNS configuration settings to an S Fuse-based copy-on-write file system in communication with the DNS system 160, which can update the resolv.conf file in the micro-VM with the configured nameservers and search domains. The DNS configuration settings provided through the API can be updated in eBPF maps, which are then used by the eBPF-based DNS caching system to apply the desired configurations. The serverless code execution system 110 may, in some examples, include a frontend 112, through which an end user can submit and configure serverless function(s) (e.g., hosted on VM instance(s) 153). An end user may illustratively provide DNS configurations through the frontend 112 to support execution of the various serverless functions (e.g., with DNS system 160), which may potentially require communication through external networks, such as network 104.

For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. To avoid the complexity of this process, the user may alternatively provide the code to the serverless code execution system 110, and request that the serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request and execute the code using the compute capacity. The serverless code execution system 110 may automatically scale up and down based on the volume of requests to execute code, thereby relieving the user from the burden of having to worry about over-utilization (e.g., acquiring too little computing resources and suffering performance issues) or under-utilization (e.g., acquiring more computing resources than necessary to run the code, and thus overpaying). The serverless code execution system 110 may, in some examples, generate and resolve DNS queries. By way of illustration, running a piece of code in connection with a web or mobile application that the user has developed, may require accessing an external API or data source. Accordingly, the serverless code execution system 110 may generate a DNS query, such as with a function running the piece of code in a first execution environment. Although FIG. 1 depicts a serverless code execution system 110, this is not meant to be limiting. The cloud provider environment 106 may also include other serverless services, such as other compute functionalities, data storage, and networking.

Code executions triggered on the serverless code execution system 110 of FIG. 1 are executed by execution environments hosted by a worker 151 within a worker fleet 150. Illustratively, an end user may invoke a function from one of the client devices 102 to the serverless code execution system 110 (referred to in various implementations as an on-demand code execution service, serverless compute service, function compute service, functions service, cloud functions service, or functions-as-a-service). The serverless code execution system 110 then can distribute execution instructions for the function and instruct the worker 151.

The worker 151 is illustratively a host system configured to host multiple execution environments, which in FIG. 1 are virtual machine VM instances 153A-N. In some implementations, virtual machine VM instances 153A-N may be managed by a compute service that the serverless code execution system 110 can call via API to create and terminate virtual machines, as needed to run serverless workloads. Execution environments may alternatively include software containers, sometimes referred to as "OS-level virtualization," another virtualization technology. These may be managed by a container service and run on top of the virtual machines of the compute service, in some implementations, and in other implementations the containers may be run directly on a host with the runtime virtualized to them by the host controller. Thus, where references are made herein to VM instances 153, it should be understood that (unless indication is made to the contrary) a container may be substituted for such VM instances 153.

As used herein, the term "virtual machine instance" is intended to refer to an execution of software or other executable code that emulates hardware to provide an environment in which software may execute (an "execution environment"). Due to their emulation of hardware, these virtual machine instances are sometimes referred to as "system virtual machines." System virtual machines are different than, for example, process virtual machines that do not emulate hardware. Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, the worker 151 may host a number of VM instances 153A-N. Each instance 153 may be isolated from other VM instances 153, thus ensuring the security of code executions on the serverless code execution system 110. For example, each VM instance 153 may be divided by a virtualization boundary, by virtue of the VM instance 153 being a virtual machine hosted by the worker 151. In addition, each VM instance 153 may exist within a partitioned user space on the worker 151, which logically partitions resources of the worker 151 among VM instances 153. Each user space may, for example, represent a "chroot" jail—a known isolation technique for LINUX™ operating systems.

According to some aspects of the present disclosure, VM instances 153 may generate DNS queries. Illustratively an VM instance 153 may host a function running the piece of code in connection with a web or mobile application that the user has developed. The code may require accessing a specified external API, data source, the like, or some combination thereof. The function may therefore generate DNS queries to get the IP address of the specified API, data source, the like, or some combination thereof. The serverless code execution system 110 may, for example, resolve the DNS query with a DNS system(s) 160 in the respective worker 151. The DNS system 160 may, for example, include a DNS cache including DNS records, where a DNS record is a piece of data that defines how domain names correspond to IP addresses, domain aliases, mail servers, name servers, administrative data, certificate authorit(ies), arbitrary text information, the like, or some combination thereof. DNS records may include, for example, records of previously visited domain names and corresponding IP addresses. Illustratively, if the result for the DNS query from a particular serverless function is present (e.g., can be found) within the DNS cache (e.g., a cache hit), a DNS system 160 corresponding to the particular serverless function may return the result to the particular serverless function. However, if a result for the query is not present (e.g., cannot be found) in the DNS cache (e.g., a cache miss), the DNS system 160 may pass the query to another resolver (e.g., recursive resolvers, root nameservers, top level domain (TLD) nameserver, authoritative nameserver, etc.)

In some examples, a separate DNS system 160 may be present for each VM instance 153 to handle DNS queries according to customized DNS configurations provided for a serverless function of each VM instance 153 by an end user (e.g., through client device(s) 102). For example, the DNS records in the DNS cache may be discarded after expiration of a time to live (TTL) specified by the user in a DNS configuration, as will be described herein. However, in some examples, a single DNS system 160 may handle DNS queries according to customized configurations for each VM instance 153, provided for a serverless function of each VM instance 153 by an end user (e.g., through client device(s) 102). DNS system(s) 160 may be, for example, an extended Berkely packet filter (eBPF) program or programs configured to run in a Linux kernel of worker 151.

In examples utilizing a single DNS system 160, a single eBPF program may be loaded into the worker 151. Different eBPF maps, which may be data structures used for sharing data between eBPF programs and other applications, may be used to store the DNS configurations provided for different serverless functions associated with (e.g., executing on) different VM instances 153. These eBPF maps may be updated based on changes made to the DNS configurations by an end user. Illustratively, if an end user updates a DNS configuration for a serverless function executing on VM instance 153A, the eBPF map corresponding to VM instance 153A may be updated to incorporate the updates to the DNS configuration.

FUSE filesystems may be used, in some examples, to provide information in a DNS configuration regarding nameserver(s) to a VM instance, such as VM instance 153A. FUSE filesystems may be filesystems created with FUSE, which may be a software interface for Unix and Unix-like operating systems that allows creation of filesystems without editing kernel code by running in userspace while a FUSE module acts as a bridge to the kernel interfaces.

However, in examples using multiple DNS systems 160, an eBPF program may be loaded into the worker 151 for each VM instance 153 as the DNS system 160 corresponding to a serverless function of that VM instance 153. The DNS configuration for the serverless function of that VM instance 153 may still be stored as an eBPF map, and the DNS system 160 for the serverless function of each VM instance 153 may also include a DNS cache (e.g., as eBPF maps, the like, or some combination thereof).

Operation of the DNS system(s) 160 within the worker 151 may serve to isolate the DNS system 160 from the VM instance 153. This isolation may advantageously increase security of DNS resolution. Because DNS system(s) 160 run in the respective worker 151 rather than the VM instance 153 they are isolated by virtual boundar(ies) from the execution of code associated with the serverless function executing in the VM instance 153. Because the code at higher risk of exposure to malware (e.g., through dependencies on open-source libraries), this isolation may advantageously increase security of DNS resolution. The DNS system(s) 160 may thus, in some examples, serve as a source of truth from which to monitor and detect unusual network behavior indicative of the infiltration.

To facilitate rapid execution of code, the worker 151 may be configured to maintain a set of VM instances 153 in a "pre-warmed" state, being at least partially configured to begin execution of code. For example, instances may be created on the worker and configured with access to computing resources (CPU, RAM, drive storage, etc.). In some cases, it may be impractical or impossible to maintain VM instances 153 in a fully warmed state for all possible code executions, as executions may be associated with a wide variety of at least partially distinct data sets (e.g., disk images and/or snapshots). Thus, VM instances 153 may be maintained in a "greatest commonality" for a given group of tasks, such as being provisioned with a set of computing resources common to those tasks, being configured to accept an operating system type used by those tasks, etc.

On receiving instructions to provision a VM instance 153 to support execution of the task, the worker 151 may adjust the configuration of the VM instance 153 to support that execution. Specifically, the worker 151 may provision the VM instance 153 with access to a disk image or snapshot corresponding to the task. In some instances, the worker 151 may retrieve the disk image for the task and store the full image locally. In other instances, the worker 151 may provide to an VM instance 153 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020, and entitled "LOW LATENCY ACCESS TO DATA SETS USING SHARED DATA SET PORTIONS" (the "'250 Application") the entirety of which is hereby incorporated by reference.

As described above, the worker 151 may, in some examples, implement a DNS system 160 corresponding to the VM instance 153. Alternatively, each worker 151 may include one DNS system 160, which handles DNS queries for all VM instances 153 included in the worker 151. The DNS system 160 may, in some examples, be implemented as an eBPF based software program. The worker 151 may, in further examples, operate as a Linux kernel, and the DNS system(s) 160 may be an eBPF program attached to a hook in the kernel (e.g., eXpress Data Path (XDP), traffic control (TC), tracepoints, Kprobes, Uprobes, socket filters, etc.) and intercept DNS packets. The DNS system(s) 160 may then log DNS queries, track sources, and analyze responses.

The DNS system 160 may, in some examples, record DNS queries, responses, the like, or some combination thereof, in accordance with the DNS configurations. Illustratively, a DNS configuration may specify that DNS queries should be logged to a network accessible data store, such as data store 170. The data store 170 may correspond to any persistent data store. In one embodiment, the data store 170 is implemented as logical storage on a cloud storage service, such as an object storage system. An example of such an object storage system is AMAZON™'s SIMPLE STORAGE SERVICE™ (or "S3™").

The DNS system 160 may, as another example, identify unexpected or suspicious behavior such as behavior relating to suspicious or malicious domains. The DNS system 160 may additionally, or alternatively include a DNS resolver. However, in some examples, the DNS system 160 may forward queries to a DNS resolver. The DNS system 160 may, for example, forward queries to an external DNS resolver, if a DNS query intercepted from a VM instance 153 is not included in a DNS cache (internal or external to the DNS system 160).

While not shown in FIG. 1, the illustrative environment can further include one or more network services—either as part of or distinct from the cloud provider environment 106—which can interact with the serverless code execution system or other elements of the cloud provider environment 106. Network services can correspond to network-connected computing devices, such as servers, which generate data accessible to the cloud provider environment 106, receive data from cloud provider environment 106, or otherwise communicate to the cloud provider environment 106. For example, the network services can include web services (e.g., associated with the client computing devices 102, with the serverless code execution system 110, or with third parties), databases, really simple syndication ("RSS") readers, social networking sites, or any other source of network-accessible service or data source. In some instances, network services may be invoked by code execution on the serverless code execution system 110, such as by API calls to the network services.

The cloud provider environment 106 is a pool of network-accessible computing resources (such as compute, storage, and networking resources, applications, and services), which may be virtualized or bare-metal. The cloud provider environment 106 can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider environment 106 can provide on-demand, scalable computing services to users through a network, for example allowing users to have at their disposal scalable "virtual computing devices." These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device.

Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for clients to access cloud infrastructure by allowing clients to obtain data from or cause actions within the cloud provider network, enabling the development of applications that interact with resources and services hosted in the cloud provider environment 106. APIs can also enable different services of the cloud provider environment 106 to exchange data with one another. Users can choose to deploy their virtual computing systems to provide network-based services for their own use and/or for use by their clients or clients. With reference to the present disclosure, a user may choose to execute a serverless function according to a specified DNS configuration with serverless code execution system 110.

The cloud provider environment 106 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

Cloud provider environment 106 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas. The disclosed techniques can provide clients with a cloud wide area network ("WAN") service that enables them to use the cloud provider backbone network to connect their own on-premise networks (as well as their networks hosted on the cloud provider network) to one another.

Clients (e.g., through client devices 102) can connect to availability zones of the cloud provider network via a publicly accessible network (e.g., the Internet, a cellular communication network). Transit Centers ("TC") are the primary backbone locations linking clients to the cloud provider network and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or "PoPs"). In some implementations, the cloud provider network can include one or more cellular networks managed and provided by the cloud provider, which can include access points at a client's premise, and which can use in-region resources to run various parts of the network. Clients can connect their premises to one another using the disclosed cloud WAN service via TCs, cloud-provided cellular networks, and/or edge locations.

The cloud provider environment 106 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the provider network. For example, it may not be possible to route from a substrate network address to an address in a production network that runs services of the cloud provider, or to a client network that hosts client resources.

The cloud provider environment 106 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

The cloud provider environment 106 is depicted in FIG. 1 as operating in a distributed computing environment including several computer systems that are interconnected using one or more computer networks (not shown in FIG. 1), which systems operate to provide the cloud provider environment 106. The cloud provider environment 106 could also operate within a computing environment having a fewer or greater number of devices than are illustrated in FIG. 1. Thus, the depiction of cloud provider environment 106 in FIG. 1 should be taken as illustrative and not limiting to the present disclosure. For example, the elements of the cloud provider environment 106 or various constituents thereof could implement various Web services components and/or peer to peer network configurations to implement at least a portion of the processes described herein. The cloud provider environment 106 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Figure 2:
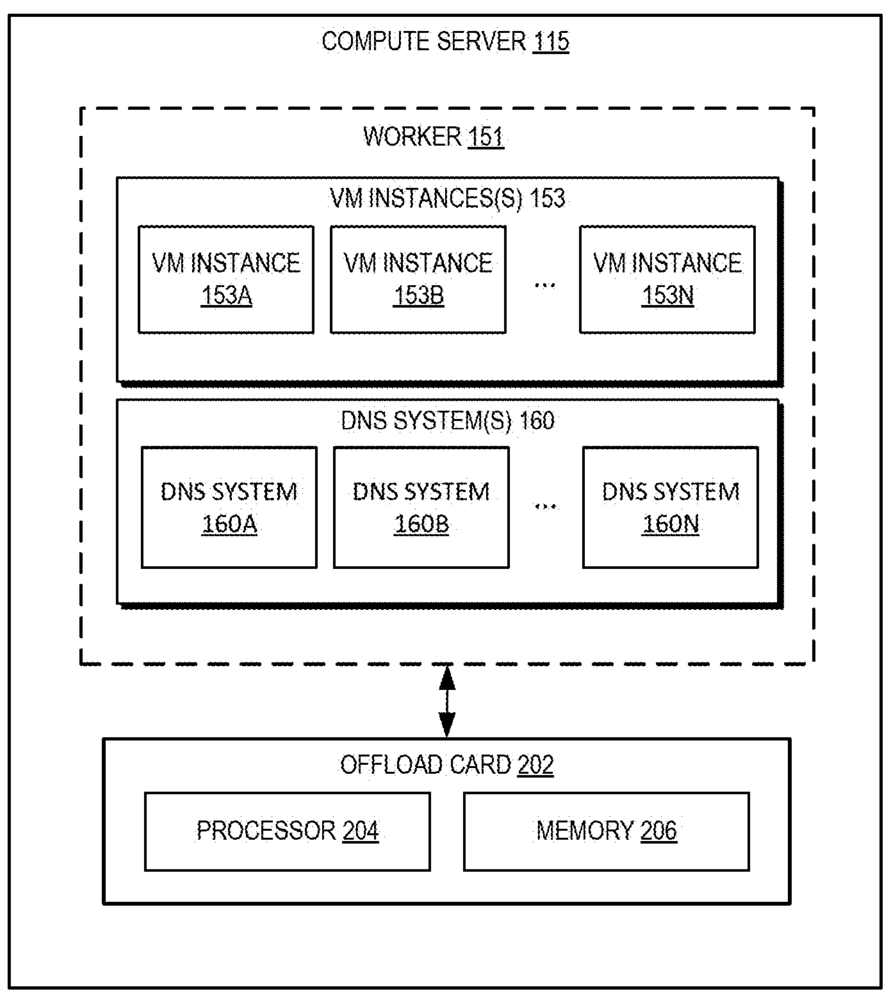
FIG. 2 depicts a logical model of connections between various elements of a compute server configured to support a worker including one or more virtual machine (VM) instances with respect to executions of serverless functions hosted on the one or more VM instances.

FIG. 2 depicts a logical model of connections between various elements of a compute server 115 configured to support a worker 151 including one or more virtual machine (VM) instances 153 with respect to executions of serverless functions hosted on the one or more VM instances 153. As described with respect to FIG. 1, the worker 151 may include one or more DNS system(s) 160 to support responses to DNS queries (e.g., inverse queries, iterative queries, inverse queries, etc.) in accordance with custom DNS configurations with respect to the execution of the serverless functions. By way of illustration, DNS system 160A may handle DNS queries in accordance with custom DNS configurations for serverless functions hosted on VM instance 153A; DNS system 160B may handle DNS queries in accordance with custom DNS configurations for serverless functions hosted on VM instance 153B; DNS system 160N may handle DNS queries in accordance with custom DNS configurations for serverless functions hosted on VM instance 150N, etc.

The compute server 115 may provide primarily processing or computational resources, such as processing power and high-speed (e.g., random access) memory to worker 151. The compute server 115 may, for example, provide some persistent storage and some processing functionality to worker 151. Though not shown, the compute server 115 may have, for example, its own processor and memory to support execution of serverless functions on VM instances 153A-N. Worker 151 may then logically partition the persistent storage of compute server 115 to support VM instances 153A-N, such as by providing sufficient resources for performance of tasks by serverless functions hosted on VM instances 153A-N.

As described with respect to FIG. 1, the DNS systems 160 may be isolated from their corresponding serverless function, which may advantageously provide an additional layer of protection against attacks from bad actors. If the bad actors manage to modify DNS requesting behavior, this unusual or suspicious requesting behavior may still be logged in the DNS system(s) 160 (e.g., in a DNS cache), which may be protected by the aforementioned isolation from their corresponding VM instance in worker 151.

Each offload card is a computing device including an isolated processor and memory within a bare metal computing instance that is capable of configuring a serverless instance and, in some cases, controlling inputs to and outputs from the serverless instance. The offload card 202 may be implemented by one or more processors, such as processor 204. The offload card 202 may, in some examples, be provided by an expansion card (e.g., PCIe card) installed on the compute server 115. The offload card 202 may also be a dongle that can be detachably connected to the compute server 115. Alternatively, the offload card 202 may be installed on or be a separate computing device communicatively coupled to the compute server 115 through a network, such as network 104 of FIG. 1. In some examples, the offload card 202 may additionally, or alternatively, present any network-accessible storage device (e.g., through network 104 of FIG. 1) as a local storage device. For example, the offload card 202 may present a memory 206 as a local storage device.

Illustratively, the offload card 202 may be utilized to implement control plane operations on the compute server 115, such as creation, configuration, or deletion of worker 151 and/or VM instance(s) 153A-N. In some examples, an offload card 202 may be isolated from the worker 151 and thus can provide processing that is secure from interference (or view) by code executing within the VM instances 153A-N included in the worker 151.

At least because the offload card includes a separate processor and memory from compute server 115, implementation of a DNS system 160 on an offload card can create a physical boundary between the DNS system 160 and its corresponding serverless instance, at least because the DNS system 160 will run on a processor of the offload card and the serverless instance will run on a processor of a separate server (e.g., of a cloud provider server). The physical boundary between the processors may advantageously increase the likelihood that the DNS system 160 will remain uncompromised in the event that one or more serverless instances have been compromised. By way of example, the physical boundary may be more resilient to side channel attacks that attempt to cross the virtualization boundary. DNS cache(s) of DNS system(s) 160 implemented on offload card(s) may therefore serve as a source of truth for detecting and analyzing whether an attack has occurred. This advantageously provides additional security against DNS-related attacks, such as DNS cache poisoning.

Accordingly, in implementations in which the DNS system(s) 160 is stored on the offload card 202, a bad actor intent on manipulating DNS information, such as by conducting a DNS cache poisoning attack, would have additionally difficulty in accessing the DNS system(s) 160 implemented the offload card 202. If a bad actor manages to compromise a serverless function in another manner and modify its DNS requesting behavior, this unusual or suspicious requesting behavior may still be logged in the DNS system(s) 160, such as in DNS query logs included in a DNS cache, which may be protected by additional security layers described herein with respect to the offload card 202. The logs may thus serve as a source of truth from which to detect or analyze the attack by the bad actor.

Figure 3:
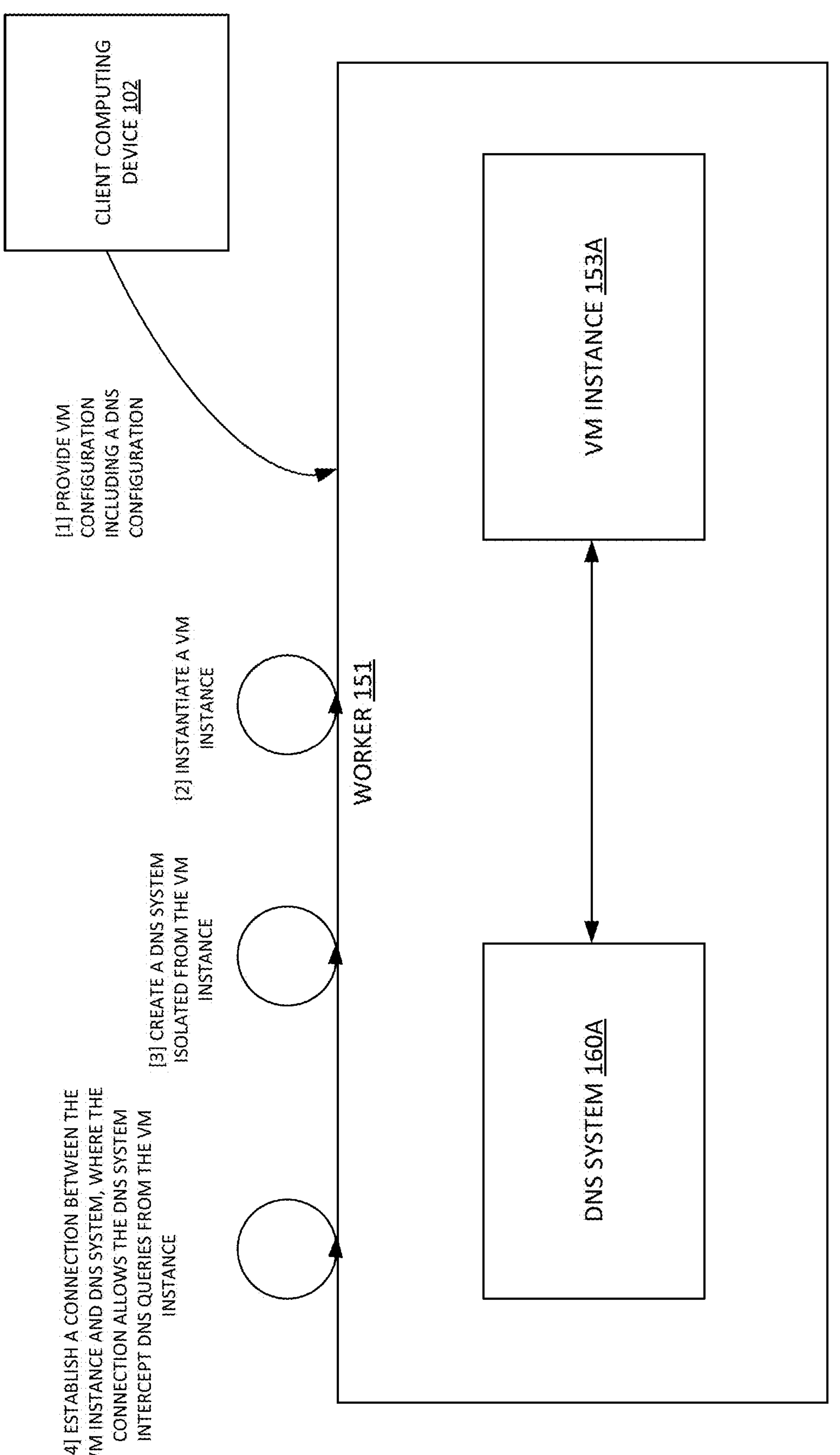
FIG. 3 depicts illustrative interactions between a client computing device, a worker environment, a DNS system and a VM instance in setting up a DNS system in accordance with a custom DNS configuration for serverless functions implemented on a serverless code execution system.

FIG. 3 depicts illustrative interactions between a client computing device 102, a worker 151, a DNS system 160A, and a VM instance 153A in setting up the DNS system 160A in accordance with a custom DNS configuration for a serverless instance hosted on VM instance 153A. The interactions of FIG. 3 may take place during an initialization phase of the VM instance 153A's lifecycle. Execution of the interactions may advantageously allow an end user to customize DNS configurations during initialization of the VM instance 153A. The customized DNS configurations may be used to improve performance of a task to be performed by the VM instance 153A, as described at [1]. The interactions of FIG. 3 may set up a DNS system 160A isolated from VM instance 153A, which may improve the security of DNS system 160A, as described above. The DNS system 160A may be a separate DNS system for handling DNS queries for a serverless function of VM instance 153A, in accordance with customized DNS configurations for a serverless function of VM instance 153A. The DNS system 160A may alternatively be part of a single larger DNS system, as described with respect to FIG. 1. The DNS system 160 may illustratively represent the components of the larger DNS system handling queries for a serverless function of VM instance 153A, such as DNS configuration data structures (e.g., eBPF maps, FUSE filesystems, etc.) specific to a serverless function of VM instance 153A, DNS caches storing DNS queries received from a serverless function of VM instance 153A, the like, or some combination thereof.

At [1], a client computing device 102 provides a VM configuration including a DNS configuration of a serverless function to worker 151. Illustratively, an invocation of the serverless function may be obtained, such as through a client computing device (e.g., client computing device 102 of FIG. 1). The worker 151 may be selected from among other workers (e.g., of worker fleet 150) of a serverless code execution system (e.g., serverless code execution system 110 of FIG. 1). As described with respect to FIG. 1, the worker 151 may be a computing device of the serverless code execution system hosting one or more VM instances. The serverless code execution system 110 may distribute to the worker 151 instructions to generate function execution environment in which to execute an instance of the serverless function and a DNS system 160 to handle DNS queries of the instance of the serverless function in accordance with the DNS configuration received at [1]. The worker 151 may accordingly use VM instance 153A as the function execution environment for the serverless function, such as by allocating resources as described with respect to FIG. 1. The worker 151 may use a DNS system 160A to handle DNS queries of the instance of the serverless function in accordance with the DNS configuration received at [1].

The VM configuration may include specification of a task, such as supporting a web or mobile application. The VM configuration may, for example, include specification of a piece of code to be executed to support execution of a web or mobile application. By way of illustration, the piece of code may be to retrieve content (e.g., text, images, audio, videos, etc.) from a network-accessible data store.

Users may, in some examples, provide DNS configuration settings through an API, referred to in some implementations as "CreateOrUpdateServerlessDNS" The settings may them provide the DNS configuration settings to an S Fuse-based copy-on-write file system in communication with the DNS system 160, which can update the resolv.conf file in the micro-VM with the configured nameservers and search domains. The DNS configuration settings provided through the API can be updated in eBPF maps, which are then used by the eBPF-based DNS caching system to apply the desired configurations.

The provided DNS configuration may include, but is not limited to, custom nameservers (e.g., to query when accessing external applications, databases, etc.), logging options to log specified packets (e.g., according to packet direction, IP address, etc.), extension mechanisms for DNS (EDNS) options, stale caching options, time to life (TTL options), retry options, search options, the like, or some combination thereof. Allowing the end user to configure DNS options for each serverless function, such as a serverless function of VM instance 153A, advantageously allows the end user to improve performance of the task to be performed by the serverless function of VM instance 153A. As one example, the DNS configuration may include an EDNS option specifying larger UDP message sizes, which may improve overall query performance and efficiency by allowing content (e.g., domain names, IP addresses, etc.) to be received more quickly. Improving DNS query performance may illustratively allow quicker retrieval of content from a network accessible data store.

The DNS configuration may additionally, or alternatively, specify query logging instructions. The query logging instructions may include, but are not limited to, a security token to call a query logging service (e.g., application programming interface (API)), identification of long-term storage (e.g., to store query logs), instructions relating to which results should be stored (e.g., in identified temporary storage, in identified long term storage, etc.), filtering instructions (e.g., domains to include/exclude, nameservers to include/exclude, etc.). Illustratively, the DNS configuration may include instructions to exclude the domain ("scam-.com"). Inclusion of query logging instructions may advantageously improve security relating to performance of the task at least by providing a source of truth from which to determine whether the VM instance executing the task has been compromised.

At [2], based on the provided VM configuration, the worker 151 instantiates VM instance 153A. The worker 151 may, for example, instantiate the VM instance 153A by logically partitioning resources of the worker 151 to VM instance 153A to support execution of the task (e.g., supporting a mobile application, supporting a web application, etc.) specified in the VM configuration, as described with respect to FIG. 1. The worker may, in further examples, allocate additional resources for execution of the specified task at [1] to a pre-warmed instance, as described with respect to FIG. 1.

At [3], the worker 151 creates a DNS system 160A isolated from the VM instance 153A. Illustratively, the worker 151 may be a Linux kernel and logically partition the VM instance 153A into a "chroot" jail, as described with respect to FIG. 1. The DNS system 160A may operate within the worker 151's kernel. By way of illustration, the DNS system 160A may be implemented as an eBPF program, where eBPF is a technology that allows sandboxed programs to run with a Linux kernel without changing the source code of the kernel. Implementing the DNS system 160A in eBPF therefore would not affect operation of the worker 151. Additionally, since eBPF programs are sandboxed, the DNS system 160A would be isolated from the operations of VM instance 153A (e.g., of a serverless function executing on VM instance 153A). Configuration for the DNS system 160 may be included in one or more eBPF maps (e.g., hash maps, array maps, Berkely packet filter (BPF) maps), which are data structures used for sharing data between eBPF programs and other applications. Illustratively, instructions included in a DNS configuration, such as to exclude the domain "scam.com." may be stored in a hash map. The DNS configuration may later be updated by updating the eBPF map, such as when VM instance 153A is being invoked. Illustratively, if the updated DNS configuration specifies to filter "fraud.com," the worker 151 may update the DNS configuration to filter "fraud.com." If the DNS configuration previously indicated that "scam.com" should be filtered from query results, the DNS configuration after updating may indicate that the DNS system 160A should filter "scam.com" and "fraud.com" from query results.

The DNS system 160A may, in some examples, also include a DNS cache, which may include, but is not limited to, responses for DNS queries received from the serverless function of VM instance 153A, such as records of previously visited domain names, IP addresses (e.g., IP addresses corresponding to the previously visited domain names, the like, or some combination thereof.) The DNS cache of the DNS system 160A may, in some examples, be implemented with eBPF maps, which are a data structure used for sharing data between eBPF programs and other applications. The DNS configuration may include a cache eviction policy and other values, like TTLs, that specify to hold particular data (e.g., DNS records) in the cache and the time period for which to hold the data.

The DNS system 160A may, in some examples, also support configurations relating to query logging. Configurations relating to query logging may include, but are not limited to, a network accessible data store in which to store the query logs, received DNS queries, results of received DNS queries (e.g., resolutions), the like, or some combination thereof.

At [4], the worker 151 establishes a connection between the VM instance 153A and the DNS system 160A, where the connection allows the DNS system 160A to intercept DNS queries from the VM instance 153A. With continued reference to the illustrative example, the eBPF program on which the DNS system 160A is based may attach to hooks, such as tracepoint hooks, within the Linux kernel of the worker 151. The hooks may allow the eBPF program to capture DNS queries from the VM instance 153A. The DNS system 160A may illustratively store logs of the queries, query responses, the like, or some combination thereof in a network-accessible datastore (e.g., data store 170 of FIG. 1). The DNS system 160A may additionally, or alternatively, resolve the queries as will be described with respect to FIG. 4. The DNS system 160A may, as another example, store responses to the queries in a DNS cache, such as IP addresses corresponding to domain names. The responses may be used to resolve future DNS queries, as described with respect to FIG. 4.

Figure 4:
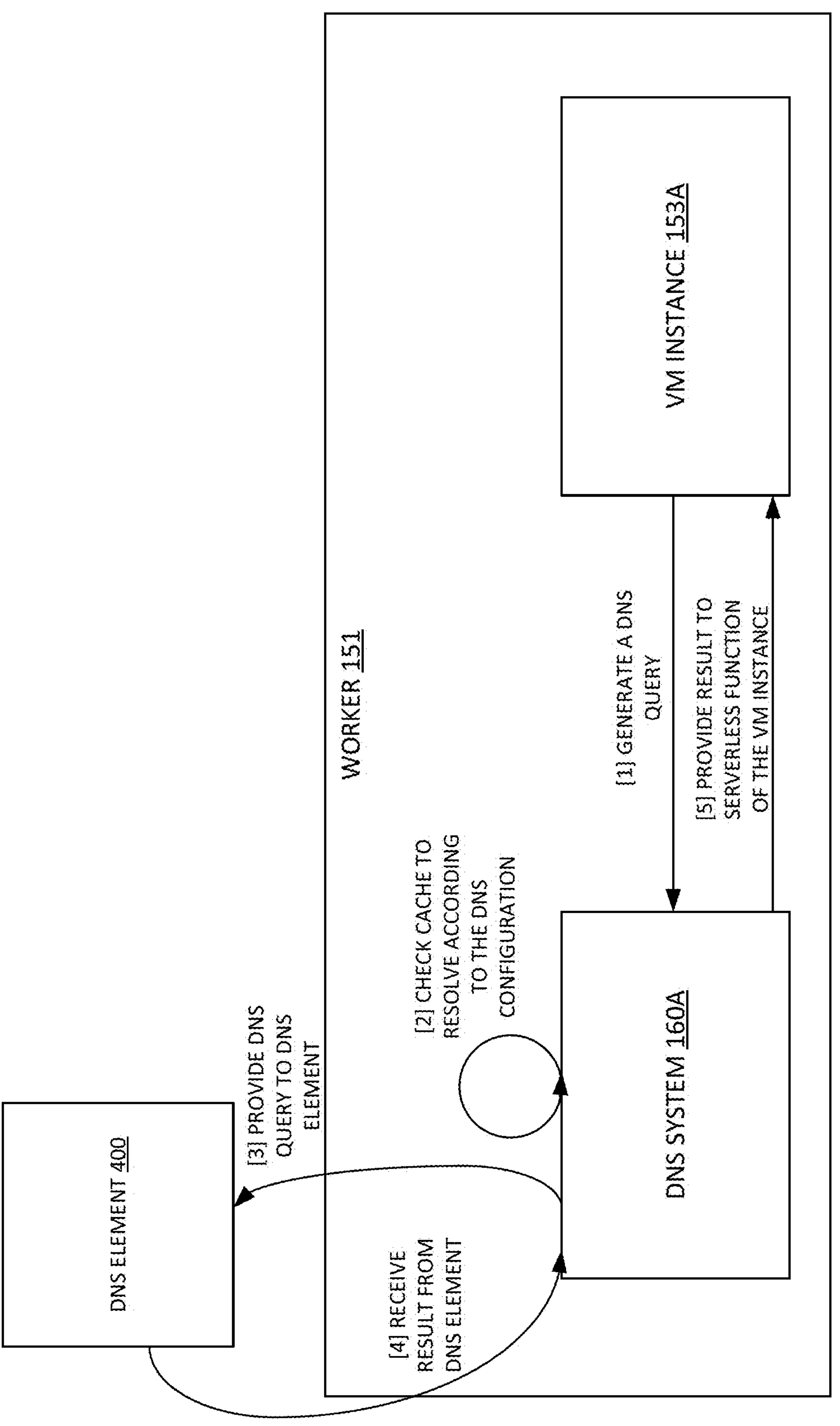
FIG. 4 depicts illustrative interactions between a client computing device, a worker environment, a DNS system and a VM instance in generating responses to DNS queries for serverless functions implemented on a serverless code execution system.

FIG. 4 depicts illustrative interactions between a client computing device 102, a worker 151, a DNS system 160A, a VM instance 153A, and a DNS element 400 in generating responses to DNS queries for serverless functions implemented on a serverless code execution system. The illustrative interactions may advantageously allow an end user to configure DNS configuration options during the invocation of a VM instance, such as VM instance 153A.

As described with respect to FIG. 3, the DNS system 160A may be a separate DNS system for handling DNS queries for a serverless function of VM instance 153A, in accordance with customized DNS configurations for a serverless function of VM instance 153A. The DNS system 160A may alternatively be part of a single larger DNS system, as described with respect to FIG. 1. The DNS system 160A may illustratively represent the components of the larger DNS system handling queries for the serverless function of VM instance 153A, such as DNS configuration data structures (e.g., eBPF maps) specific to the serverless function of VM instance 153A, DNS caches storing DNS queries received from the serverless function of VM instance 153A, the like, or some combination thereof.

At [1], the VM instance 153A generates a DNS query. The VM instance 153A may be invoked to execute a serverless function corresponding to a task. The task may be, for example, retrieving content for a web or mobile application from one or more websites or network-accessible data sources. Accordingly, the VM instance 153A may generate a DNS query specifying domains for the one or more websites or network accessible data sources from which the content should be retrieved. As one example, the VM instance 153A may generate a query to resolve IP addresses for "good.com;" "great.com," "magnificent.com," "fraud.com," and "scam.com."

At [2], the DNS system 160A checks a DNS cache to resolves the query according to the DNS configuration. As described with respect to FIG. 3, the DNS system 160A may intercept DNS queries from VM instance 153A with an eBPF program that latches onto hooks (e.g., tracepoint hooks) in the worker 151. Once intercepted, the DNS system 160A may resolve the query in accordance with a DNS configuration received from the user.

The DNS system 160A may specify, for example, instructions relating to a DNS cache (e.g., stale caching options, time to life (TTL options), etc.). For example, the DNS records in the DNS cache may be discarded after expiration of a time to live (TTL) specified by the user in a DNS configuration, as will be described herein. The DNS records in the DNS cache may include, but are not limited to, data that defines how domain names correspond to IP addresses, domain aliases, mail servers, name servers, administrative data, certificate authority, arbitrary text information, the like, or some combination thereof. Illustratively, if the result of a DNS query from a particular serverless function is present within the DNS cache (e.g., a cache hit), a DNS system 160 corresponding to the particular serverless function may return the result to the particular serverless function. However, if a response to the query is not present in the DNS cache (e.g., a cache miss), the DNS system 160 may pass the query to another DNS element, such as DNS element 400. DNS element 400 may be a recursive resolver, root nameserver, top level domain (TLD) nameserver, authoritative nameserver, or the like.

At [3], the worker 151 provides the DNS query to the DNS element 400 with the DNS system 160A. Illustratively, the DNS configuration may, for example, specify the DNS element 400 as a resolver (e.g., a recursive resolver, root nameserver, top level domain (TLD) nameserver, authoritative nameserver, or the like). DNS resolvers are well known in the art and thus will not be described in detail herein. Based on the DNS query, the DNS element 400 may return a result based on its internal DNS cache. Alternatively, the DNS element 400 may forward the DNS query up a hierarchy of resolvers (e.g., a hierarchy of nameservers specified in the DNS cache of DNS system 160A) until one of the nameservers returns a result.

At [4], the DNS element 400 may provide the result to the worker 151. As illustrated in FIG. 4, for example, the DNS element 400 provides the result to DNS system 160A of the worker 151. The worker 151, with the DNS system 160A, may then provide the result to the serverless function of the VM instance.

The DNS configuration may, in some examples, further specify query logging instructions including, but not limited to, to call a query logging service (e.g., application programming interface (API)), identification of long-term storage (e.g., to store query logs), instructions relating to which results should be stored (e.g., in a cache of the DNS system 160A, in the identified long term storage, etc.), filtering instructions (e.g., domains to include/exclude, nameservers to include/exclude, etc.). The DNS configuration may specify, for example, to store results in a cache of DNS system 160A for a specified TTL, to store query logs in a data store (e.g., data store(s) 170 of FIG. 1), to filter domains from query results (e.g., fraud.com), or the like. As one example, the DNS configuration may provide that results from "fraud.com" and "scam.com" should be excluded from query results. As discussed above, "fraud.com" and "scam-.com" may be bad actors which may intend to cause the serverless function of the VM instance 153A to download content from malicious sites, such as sites including malware or the like. Accordingly, the DNS system 160A may generate a result including IP addresses corresponding to "good.com;" "great.com," "magnificent.com," but excluding IP addresses for "fraud.com" and "scam.com" prior to providing the result to a serverless function of the VM instance 153A at [5].

At [5], the DNS system 160A provides the result. With continued reference to the illustrative example of [2]-[4], the DNS system 160A may provide a response including the IP addresses for "good.com;" "great.com," "magnificent.com," to VM instance 153A. The serverless function hosted on VM instance 153A may then use the IP addresses to retrieve content from the specified websites, network accessible data sources, the like, or some combination thereof, corresponding to the IP addresses.

The result may be stored in a DNS cache in accordance with a DNS configuration described with respect to [2]. The DNS cache may also be used, in some examples, to diagnose security issues. Illustratively, as described at least with respect to FIG. 3 above, the DNS system 160 is isolated from VM instance 153A. Accordingly, if the serverless function of VM instance 153A is compromised (e.g., by malware) and starts sending out spurious DNS requests, the results of those spurious DNS requests may be logged in the DNS cache of the DNS system 160A. An end user, security service, the like, or some combination thereof may accordingly analyze the DNS cache to determine that an attack has occurred. The end user may, in some examples, also provide a data store (e.g., data store 170 of FIG. 1) in the DNS configuration to which the DNS system 160 should forward some or all query logs (e.g., queries, results of the queries, etc.). The end user may specify, for example, that requests relating to "fraud.com" and "scam.com." should be stored in the data store. The end user may then analyze or call a service to analyze the query logs to detect whether an attack has occurred. Allowing end users to provide DNS configurations with respect to serverless instances, such as VM instance 153A, may therefore improve security of the execution of the end user's task.

DNS system 160A may also, in some examples, not attempt to resolve the IP addresses for "fraud.com" and "scam.com" based on instructions in the DNS configuration that results from "fraud.com" and "scam.com" should be excluded from query results. This may advantageously reduce time required for VM instance 153A to complete a task, such as retrieval of content from websites, network accessible data sources, the like, or some combination thereof.

Figure 5:
FIG. 5 depicts an example method for customized management of DNS queries for serverless functions implemented on a serverless code execution system.
Figure 5:
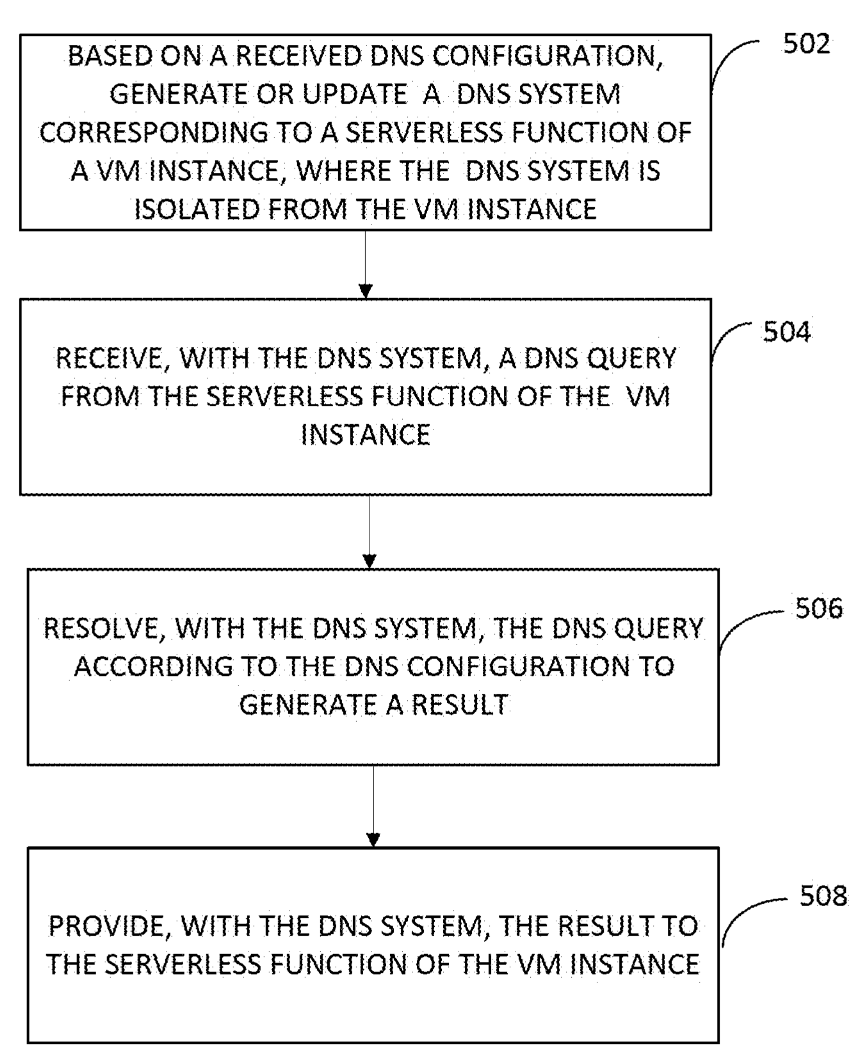

FIG. 5 depicts an example method 500 for customized management of DNS queries for serverless functions implemented on a serverless execution system. Some of the processes, steps, and/or modules discussed herein with respect to FIG. 5 may be combined, separated into sub-parts, omitted entirely, and/or rearranged to run in a different order and/or in parallel. In addition, in some embodiments, different blocks may execute on various components of a serverless code execution system, such as serverless code execution system 110 of FIG. 1. By way of illustration, the method 500 may be implemented by a worker (e.g., worker 151 of FIGS. 1-4).

At block 502, based on a received DNS configuration, the worker (e.g., worker 151) generates or updates a DNS system corresponding to a VM instance hosting a serverless function, where the DNS system is isolated from the VM instance (e.g., through a virtualization boundary, a physical boundary, etc.). The DNS system (e.g., DNS system(s) 160) may include, but is not limited to, a data store, which the DNS system(s) 160 may use to store received configurations relating to one or more VM instance(s) (e.g., VM instance(s) of FIGS. 1-4). The DNS system(s) 160 may additionally, or alternatively, include a DNS cache (e.g., to temporarily store query results), a DNS resolver, the like, or some combination thereof.

A DNS system 160 may be generated where no DNS configuration has previously been received for a serverless function of a particular VM instance, as described with respect to FIG. 3. In examples where a single program is configured for serverless functions of all VM instance(s), a DNS system 160 may be generated once by loading a program onto worker 151 (e.g., an eBPF program). Thereafter, DNS configurations for each instance may be stored as separate data structures (e.g., eBPF maps, FUSE filesystems, etc.). In examples where DNS system(s) 160 are implemented as multiple programs, generation of a DNS system 160 may include generating a program to implement the DNS configuration for the serverless function of the particular VM instance.

DNS system(s) 160 may be updated when a prior configuration already exists. Illustratively, an end user may provide an updated DNS configuration for the serverless function of VM instance 153A, as described with respect to FIG. 4. In examples where a single program is configured for serverless function(s) of all VM instance(s), the data structure corresponding to the serverless function of a VM instance 153A (e.g., an eBPF map) may be updated to reflect any changes between the prior DNS configuration and the received DNS configuration. Illustratively, if a TTL was 5 minutes in the prior DNS configuration, but 10 minutes in a DNS configuration received at block 502, an eBPF map corresponding to the serverless function of VM instance 153A may be updated from 5 minutes to 10 minutes. In examples where DNS system(s) 160 are implemented as multiple programs, updating DNS system(s) 160 may involve updating the program, updating a data file accessible to the program (e.g., eBPF map, FUSE filesystem, etc.) and including the DNS configuration, the like, or some combination thereof.

Turning to isolation, as described with respect to FIGS. 1-4, DNS system(s) 160 may be isolated from the VM instance (e.g., VM instance 153A) through virtualization boundar (ies) by implementation in the Linux kernel of the worker 151. The DNS system(s) 160 may, for example, be loaded into the worker 151's Linux kernel as an ePBF program configured to intercept DNS queries from a VM instance (e.g., VM instance 153A), as described with respect to FIGS. 3-4. The DNS system(s) 160 may, in some examples, utilize tracepoint hooks in the worker 151's Linux kernel to access DNS queries from one or more VM instance (s) 153. The DNS system(s) 160 may store information in a received DNS configuration (e.g., received at block 502) as part of an eBPF map. A different eBPF map may be used to store DNS configurations for each VM instance 153, for example. In one example, the eBPF map corresponding to the serverless function of VM instance 153A may later be called when the DNS system(s) 160 resolves queries received from the serverless function of VM instance 153A, as will be described with respect to block 506. In some examples, a DNS cache corresponding to the serverless function of VM instance 153A may be generated to store DNS queries received from the serverless function of VM instance 153A, as will be described with respect to block 506.

However, as another example, the DNS system(s) 160 may be implemented on an offload card (e.g., offload card 202 of FIG. 2). The offload card 202 may provide isolation by through provision of a physical boundary where operations of the offload card are on a separate processor and memory from a processor and memory used to execute a serverless function (e.g., a processor and memory of compute server 115 of FIG. 2). As described with respect to FIG. 2, for example, the offload card 202 may include a processor 204 and a memory 206. The DNS system(s) 160 may be implemented by processor 204 as one or more programs (e.g., one program for all serverless function(s) of VM instance(s) 153A-N, a program for each serverless function of VM instances 153A-N, etc.). Configuration instructions for serverless functions for each of VM instance 153A-N handled by the DNS system(s) 160 may be included in memory 206. The memory 206 may also include DNS caches corresponding to serverless functions of each of VM instance 153. The caches may illustratively be created in accordance with the DNS configuration for serverless functions of each VM instance 153. Illustratively, if the configuration for the serverless function of VM instance 153A specifies that a TTL for data items in its respective DNS cache is one day, data items in its respective DNS cache may be deleted (e.g., by processor 204, memory 206, etc.) after one day.

At block 504, the worker 151 receives, with a DNS system (e.g., DNS system(s) 160), a DNS query from a serverless function of a VM instance (e.g., VM instance 153A). As described with respect to FIG. 4, the DNS system(s) 160 may intercept DNS queries from serverless function(s) of VM instance(s) 153A-N. The DNS system(s) 160A may be eBPF program(s) integrated with tracepoint hooks on the Linux kernel of worker 151 and thereby receive the DNS queries from serverless functions of VM instance (s) 153A-N.

By way of illustration, and with continued reference to FIG. 4, DNS system 160A may receive a DNS query from the serverless function of VM instance 153A. The DNS system 160A may be a separate DNS system for handling DNS queries for the serverless function of VM instance 153A, in accordance with customized DNS configurations for the serverless function of VM instance 153A. The DNS system 160A may alternatively be part of a single larger DNS system, as described with respect to FIG. 1. The DNS system 160 may illustratively represent the components of the larger DNS system handling queries for the serverless function of VM instance 153A, such as DNS configuration data structures (e.g., eBPF maps) specific to VM instance 153A, DNS caches storing DNS queries received from VM instance 153A, the like, or some combination thereof.

The VM instance 153A may be invoked, in some examples to execute a serverless function corresponding to a task. The task may be, for example, retrieving content for a web or mobile application from one or more websites or network-accessible data sources. Accordingly, the worker 151, with VM instance 153A, may facilitate generation a DNS query, by the serverless function of VM instance 153A, specifying domains for the one or more websites or network accessible data sources from which the content should be retrieved. As one example, the query may be to resolve IP addresses for "good.com," "great.com," "magnificent.com," "fraud.com," and "scam.com." The worker 151 may then receive the query with DNS system 160A.

At block 506, the worker 151 resolves, with a DNS system (e.g., DNS system(s) 160) the DNS query received at block 504 according to the DNS configuration received at block 502 in order to generate a result. With continued reference to the illustrative example, the DNS configuration received at block 502 may provide results from "fraud.com" and "scam.com" should be excluded from query results. When responding to a DNS query, the worker 151 may access this configuration by accessing an eBPF map corresponding to VM instance 153A. Based on the configuration, the worker 151, with DNS system 160A, may generate a response including IP addresses corresponding to "good-.com;" "great.com," "magnificent.com," but excluding IP addresses for "fraud.com" and "scam.com."

Allowing end users to provide DNS custom configurations at block 502 with respect to serverless instances, such as VM instance 153A, may improve security of the execution of the end user's task. As described above, "fraud.com" and "scam.com" may be bad actors which may lead VM instance 153A to download content from malicious sites, such as sites including malware or the like. Accordingly, if the serverless function of VM instance 153A is compromised (e.g., by malware) and starts sending out spurious DNS requests, those spurious DNS requests may be logged in the DNS cache of the DNS system 160A. Worker 151's isolation of DNS system 160A from VM instance 153, as described with respect to block 502, may allow the DNS cache of DNS system 160A to serve as a source of truth from which an end user, security service, the like, or some combination thereof may analyze the DNS cache to determine that an attack has occurred.

Worker 151 may also, in some examples, not attempt to resolve the IP addresses for "fraud.com" and "scam.com." with DNS system 160A, based on instructions in the DNS configuration received at block 502, that results from "fraud-.com" and "scam.com" should be excluded from query results. This may reduce time required for VM instance 153A to complete a task, such as retrieval of content from websites, network accessible data sources, the like, or some combination thereof.

At block 508, the worker 151 provides, with the DNS system (e.g., DNS system(s) 160A), the result to the VM instance (e.g., VM instance(s) 153A-N). With continued reference to the illustrative example, the worker 151 may provide, with the DNS system 160A a response including the IP addresses for "good.com;" "great.com," "magnificent-.com," to VM instance 153A. The serverless function hosted on VM instance 153A may then use the IP addresses to retrieve content from the specified websites, network accessible data sources, the like, or some combination thereof corresponding to the IP addresses.

Figure 6:
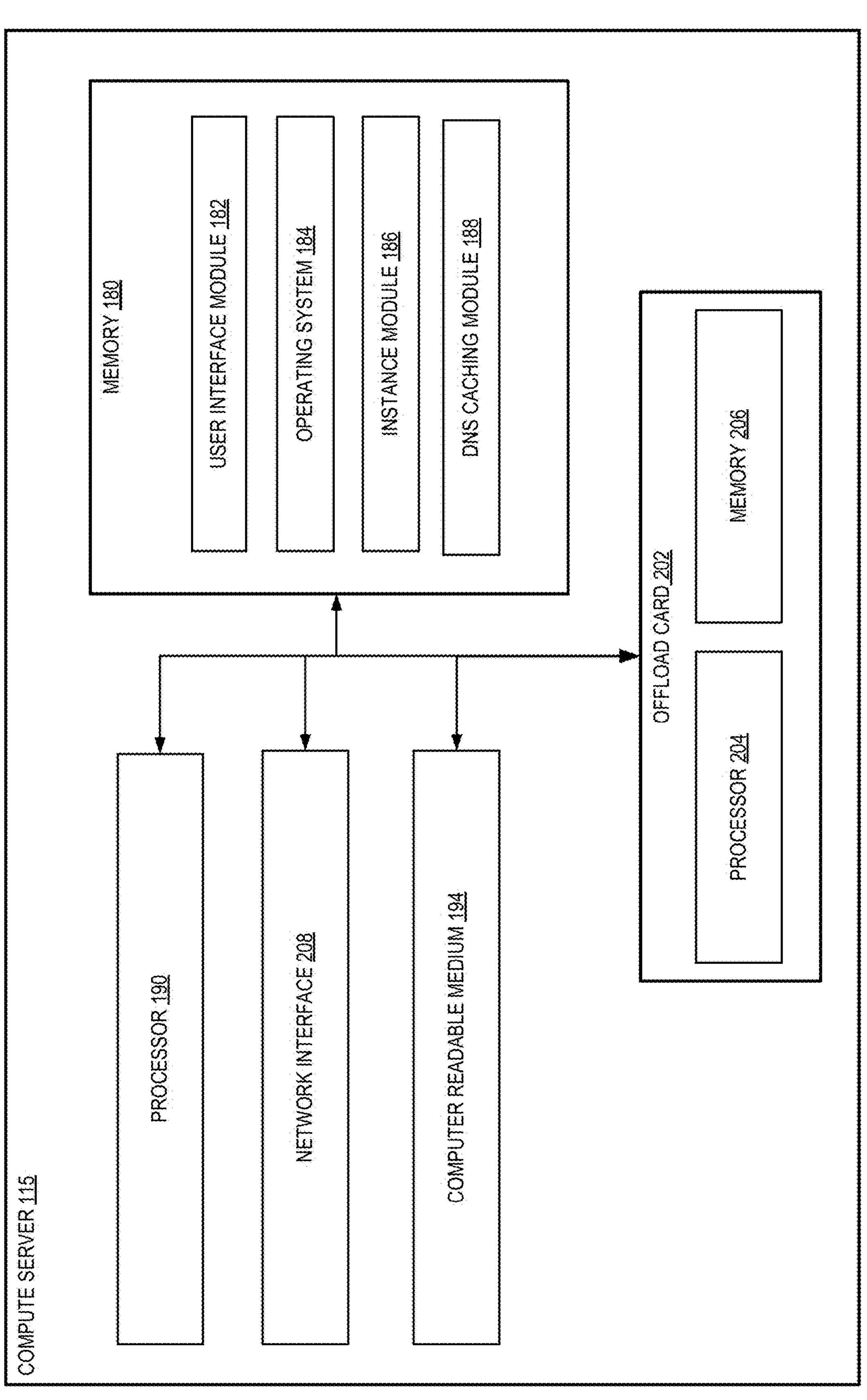
FIG. 6 depicts an example architecture of a server, such as the compute server, which can be used to perform one or more of the techniques described herein or illustrated in FIGS. 1-5.

FIG. 6 depicts an example architecture of a server, such as the compute server, which can be used to perform one or more of the techniques described herein or illustrated in FIGS. 1-5. The general architecture of the compute server 115 depicted in FIG. 6 includes an arrangement of computer hardware and software modules that may be used to implement one or more aspects of the present disclosure.

The compute server 115 may include many more (or fewer) elements than those shown in FIG. 6. It is not necessary, however, that all of these elements be shown in order to provide an enabling disclosure. As illustrated, the compute server 115 includes a memory 180, a processor 190, a network interface 208, and a computer-readable medium 194, and an offload card 202 all of which may communicate with one another by way of a communication bus. The network interface 208 may provide connectivity to one or more networks or computing systems. The processor 190 may thus receive information and instructions from other computing systems or services via the network 104 illustrated in FIG. 1.

The processor 190 may also communicate with memory 180. The memory 180 may include computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the compute server 115. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include an instance module 186 representing code executable to host VM instances, which may utilize components of the compute servers 115 (e.g., the processor 190, network interface 208, etc.) as virtualized hardware supporting execution of VM instances. The memory 180 may additionally, or alternatively, include a DNS caching module 188 representing code executable to host DNS system(s) 160 of FIGS. 1-5. DNS caching module 188 may illustratively store DNS caches including DNS records (e.g., IP addresses corresponding to domain names). The DNS records may correspond to responses from prior queries corresponding to serverless function(s) of one or more VM instance(s) 153. DNS caching module 188 may additionally, or alternatively, store information relating to DNS configurations for serverless functions of VM instance(s) 153 (e.g., received from users through client devices 102), as described with respect to FIG. 1. DNS caching module 188 may additionally, or alternatively, store instructions for implementing DNS resolution to resolve queries from one or more VM instances 153, such as to implement the interactions and methods described with respect to FIGS. 3-5 above.

The network interface 208 may commonly support one or more wireless networking protocols (e.g., Wi-Fi/IEEE 802.11, or another wireless networking standard). However, in various embodiments, network interface 208 may support communication via any suitable wired or wireless general data networks, such as other types of Ethernet networks, for example. Additionally, network interface 208 may support communication via telecommunications/telephony networks such as analog voice networks or digital fiber communications networks, via storage area networks such as Fibre Channel SANs, or via any other suitable type of network and/or protocol. While the network interface 208 is shown as a separate component in FIG. 6, this is not intended to be limiting. The network interface 208 may be a component of offload card 202, according to some embodiments. In yet other embodiments, the offload card 202 may include a separate network interface from that of the compute server 115.

As discussed above, a VM instance (or other software executing within memory 180, particularly in the case of a "bare metal" instance) may thereafter interact with network-accessible services via interaction with the offload card 202. Interaction with the offload card 202 may be handled with network interface 208. Additionally, or alternatively, interaction with the offload card 202 may be handled with a network interface of the offload card 202.

As shown in FIG. 6, the offload card 202 can include hardware isolated from other hardware of the compute servers 115. The offload card 202 may be implemented as an expansion card (e.g., PCIe card) installed on the compute server. The offload card 202 may also be a dongle that can be detachably connected to the compute server. As illustrated, offload card 202 may include a processor 204, and a memory 206, and possibly one or more network interfaces that are connected using an I/O interface (e.g., a bus implementing a version of the Peripheral Component Interconnect-Express (PCI-E) standard, or another interconnect such as a QuickPath interconnect (QPI) or UltraPath interconnect (UPI)).

The offload card 202 may include many more (or fewer) elements than those shown in FIG. 6. For example, while FIG. 6 depicts offload card 202 with a single processor 204, this is not intended to be limiting. The offload card 202 may have multiple processors. Additionally, while FIG. 6 depicts offload card 202 with a single memory 206, the offload card 202 may incorporate multiple data storage components (e.g., memories). The offload card 202 may, in some examples, include instructions or data relating to operation of DNS system(s) 160 of FIGS. 1-5. The offload card 202 may, for example, include DNS caching module 188. It is not necessary, however, that all of these elements be shown in order to provide an enabling disclosure.

Processor 204 may include a single core. However, processor 210 may alternatively include multiple different cores. In some embodiments, offload card 202 may include multiple processors. In further embodiments, each processor may handle different types of operations. For example, one processor may handle compute intensive operations (e.g., cryptographic operations for secure communications) and another processor may handle latency-sensitive I/O operations, which require processing within specific time-constraints (e.g., to complete a given operation in a pre-defined amount of time such as milliseconds). To enable latency-sensitive operations, processor 210 may maintain a constant processing speed (as opposed to varying in speed), may lack or disable power states (e.g., C states or P states), may guarantee operations ordering (as opposed to reordering operations), etc.

The memory 206 may include processor instructions executable to facilitate operation of processor 204, such as establishing a secure connection with a server device over a network by the processor 204, performing cryptographic operations, and/or implementing the virtualization manager to handle I/O communications between compute server 115 and a network-accessible storage devices. The memory 206 may be implemented using any suitable memory technology (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

While FIG. 6 is depicted as the compute servers 115, a similar device may be used to implement other elements of FIGS. 1-2. For example, a device having a similar configuration when programmed with appropriate modules may be used to implement compute servers 115, serverless code execution system 110, worker fleet 150, etc.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some examples, the computer system may be a cloud-based computing system whose processing resources are shared by multiple distinct business entities or other users.

Depending on the example, certain acts, events, or functions of any of the processes or algorithms described herein can be performed in a different sequence, can be added, merged, or left out altogether (e.g., not all described operations or events are necessary for the practice of the algorithm). Moreover, in certain examples, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the examples disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the examples disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another example, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without other input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various examples, it can be understood that various omissions, substitutions, and changes in the form and details of the devices or algorithms illustrated can be made without departing from the spirit of the disclosure. As can be recognized, certain examples described herein can be embodied within a form that does not provide all of the features and benefits set forth herein, as some features can be used or practiced separately from others. The scope of certain examples disclosed herein is indicated by the appended claims rather than by the foregoing description. All changes which come within the meaning and range of equivalency of the claims are to be embraced within their scope.

What is claimed is:

1. One or more non-transitory computer-readable media storing instructions that, when executed, cause a computing system to perform operations comprising:

receiving, with a serverless code execution system, a DNS configuration for a serverless function;

responsive to an invocation of the serverless function, generating, on a worker system, a function execution environment in which to execute an instance of the serverless function and a DNS system handling DNS queries of the instance of the serverless function in accordance with the DNS configuration, wherein the DNS system is isolated from the function execution environment by implementation of the DNS system in a separate execution environment from the function execution environment;

accessing a DNS query from the function execution environment to resolve a domain name;

using the DNS system, resolving the domain name in accordance with the DNS configuration; and providing to the function execution environment a result of the DNS query comprising an IP address corresponding to the domain name.

2. The one or more non-transitory computer-readable media of claim 1, wherein the DNS configuration includes an indication of DNS settings relating to at least one of DNS resolution, DNS caching, or DNS query logging.

3. The one or more non-transitory computer-readable media of claim 1, wherein the instructions, when executed, further cause the computing system to store the result in a DNS cache in accordance with the DNS configuration.

4. The one or more non-transitory computer-readable media of claim 1, wherein to receive, with the serverless code execution system, the DNS configuration for the serverless function, the instructions, when executed, further cause the computing system to receive input from an end user through an application programming interface, the input comprising an indication of settings with respect to at least one of logging DNS queries or resolving DNS queries.

5. The one or more non-transitory computer-readable media of claim 1, wherein to resolve the domain name in accordance with the DNS configuration, the instructions, when executed, further cause the computing system to handle a cache hit, wherein the cache hit indicates that the result can be found in a DNS cache of the DNS system, and wherein handling the cache hit comprises:

accessing the DNS configuration;

determining the result from the DNS cache of the DNS system; and providing the result to the function execution environment.

6. The one or more non-transitory computer-readable media of claim 1, wherein to resolve the domain name in accordance with the DNS configuration, the instructions, when executed, further cause the computing system to handle a cache miss, wherein the cache miss indicates the result cannot be found in a DNS cache of the DNS system, and wherein handling the cache miss comprises:

accessing the DNS configuration;

failing to determine the result from the DNS cache of the DNS system;

calling a second resolver;

receiving the result from the second resolver; and providing the result to the function execution environment.

7. The one or more non-transitory computer-readable media of claim 1, wherein the separate execution environment is an offload card, wherein the offload card is a separate computing device communicatively coupled to a server hosting the worker system.

8. The one or more non-transitory computer-readable media of claim 1, wherein the separate execution environment is an operating system kernel on the worker system.

9. The one or more non-transitory computer-readable media of claim 1, wherein the instructions, when executed, further cause the computing system to perform operations further comprising updating the DNS system at least by updating an eBPF map to include the DNS configuration.

10. The one or more non-transitory computer-readable media of claim 1, wherein to generate the DNS system, the instructions, when executed, further cause the computing system to perform operations comprising:

loading an eBPF program configured to intercept DNS queries from the serverless function;

creating an eBPF map including the DNS configuration; and creating a DNS cache in accordance with the DNS configuration.

11. A system comprising:

computer-readable memory comprising computer-executable instructions; and one or more processors in communication with the computer-readable memory, wherein the computer-executable instructions, when executed by the one or more processors, cause the one or more processors to at least:

receive, with a serverless code execution system, a DNS configuration for a serverless function;

responsive to an invocation of the serverless function, generate, on a worker system, a function execution environment in which to execute an instance of the serverless function and a DNS system handling DNS queries of the instance of the serverless function in accordance with the DNS configuration, wherein the DNS system is isolated from the function execution environment by implementation of the DNS system in a separate execution environment from the function execution environment;

access a DNS query from the function execution environment to resolve a domain name;

using the DNS system, resolve the domain name in accordance with the DNS configuration; and provide to the function execution environment a result of the DNS query comprising an IP address corresponding to the domain name.

12. The system of claim 11, wherein the worker system comprises a virtual machine (VM) executing on a host system.

13. The system of claim 11, wherein the DNS system comprises an extended Berkeley Packet Filter (eBPF) based DNS caching system.

14. The system of claim 11, wherein the DNS system executes in an isolated memory space.

15. The system of claim 11, wherein to receive the DNS configuration for the serverless function, the serverless code execution system is configured to receive input via an application programming interface (API) comprising an indication of configuration settings for the DNS system.

16. The system of claim 11, wherein generating the function execution environment and the DNS system comprises:

selecting a worker system of the serverless code execution system on which to execute an instance of the serverless function; and distributing, to the worker system, instructions to generate the function execution environment and the DNS system configured to handle DNS queries of the instance of the serverless function in accordance with the DNS configuration.

17. A method for providing configurable Domain Name System (DNS) settings for serverless application instances, comprising:

receiving, with a serverless code execution system, a DNS configuration for a serverless function;

responsive to an invocation of the serverless function, generating, on a worker system, a function execution environment in which to execute an instance of the serverless function and a DNS system handling DNS queries of the instance of the serverless function in accordance with the DNS configuration, wherein the DNS system is isolated from the function execution environment by implementation of the DNS system in a separate execution environment from the function execution environment;

accessing a DNS query from the function execution environment to resolve a domain name;

using the DNS system, resolving the domain name in accordance with the DNS configuration; and providing to the function execution environment a result of the DNS query comprising an IP address corresponding to the domain name.

18. The method of claim 17, wherein accessing the DNS query from the function execution environment comprises intercepting the DNS query using an eBPF program configured to intercept DNS queries from the serverless function.

19. The method of claim 17, wherein resolving the domain name in accordance with the DNS configuration comprises using configuration settings stored in one or more eBPF maps associated with the DNS system.

20. The method of claim 17, wherein using the DNS system to resolve the domain name comprises using a DNS cache, and handling a cache hit by determining the result from the DNS cache and providing the result to the function execution environment.

21. The method of claim 17, wherein using the DNS system to resolve the domain name further comprises handling a cache miss by calling a second resolver, receiving the result from the second resolver, and providing the result to the function execution environment.

* * * * *